United States Patent
Takeda et al.

[15] 3,658,647
[45] Apr. 25, 1972

[54] METHOD FOR THE CULTIVATION OF YEASTS IN A NUTRITIVE MEDIUM CONTAINING A NONIONIC SURFACE ACTIVE AGENT

[72] Inventors: Isao Takeda, Ohi-machi; Takashi Iguchi, Tokyo; Katsuaki Tsuzuki, Nobeoka-shi; Tooru Nakano, Tokyo, all of Japan

[73] Assignee: Asahi Kasei Kogyo Kabushiki Kaisha, Osaka, Japan

[22] Filed: Jan. 14, 1970

[21] Appl. No.: 2,741

[30] Foreign Application Priority Data

Feb. 26, 1969 Japan......................44/13946

[52] U.S. Cl. .....................195/28 R, 195/82, 195/115, 195/114
[51] Int. Cl. .........................A23j 1/18, C12c 11/08
[58] Field of Search..............195/28 R, 3 H, 82, 115, 114

[56] References Cited

UNITED STATES PATENTS

| | | | |
|---|---|---|---|
| 2,697,061 | 12/1954 | Harris et al.................195/3 H X |
| 3,212,994 | 10/1965 | Kono et al...................195/114 X |
| 3,271,266 | 9/1966 | Laine et al....................195/28 R X |
| 3,293,145 | 12/1966 | Leavitt et al..................195/114 X |
| 3,326,771 | 6/1967 | Leavitt..........................195/28 R X |
| 3,355,296 | 11/1967 | Perkins et al.................195/28 R X |
| 3,411,989 | 11/1968 | Nakao et al..................195/82 X |
| 3,474,001 | 10/1969 | Leavitt..........................195/28 R |
| 3,510,403 | 5/1970 | Laine et al....................195/3 H |

Primary Examiner—Joseph M. Golian
Attorney—Flynn & Frishauf

[57] ABSTRACT

Method for the cultivation of yeasts by a continuous fermentation process which comprises (a) cultivating *Torulopsis petrophilum*, *Candida petrophilum* or *Brettanomyces petrophilum*, a species of yeast capable of consuming hydrocarbons as the carbon source in a medium containing a hydrocarbon fraction boiling at temperatures in a range of 200° to 360° C.; (b) conducting said cultivation in an apparatus consisting of (1) an emulsification tank mainly for forming emulsion of said hydrocarbon and an aqueous solution and (2) a main fermentation tank for effecting cell formation or fermentative production of useful substances, said tank being connected in series; (c) using as the medium in said emulsification tank a medium containing said hydrocarbon at a high concentration, the fermentation waste liquor from the main fermentation tank and a small amount of nonionic surface active agent; and (d) using as the medium in said main fermentation tank the emulsified fermentation liquor obtained in said emulsification tank.

7 Claims, 1 Drawing Figure

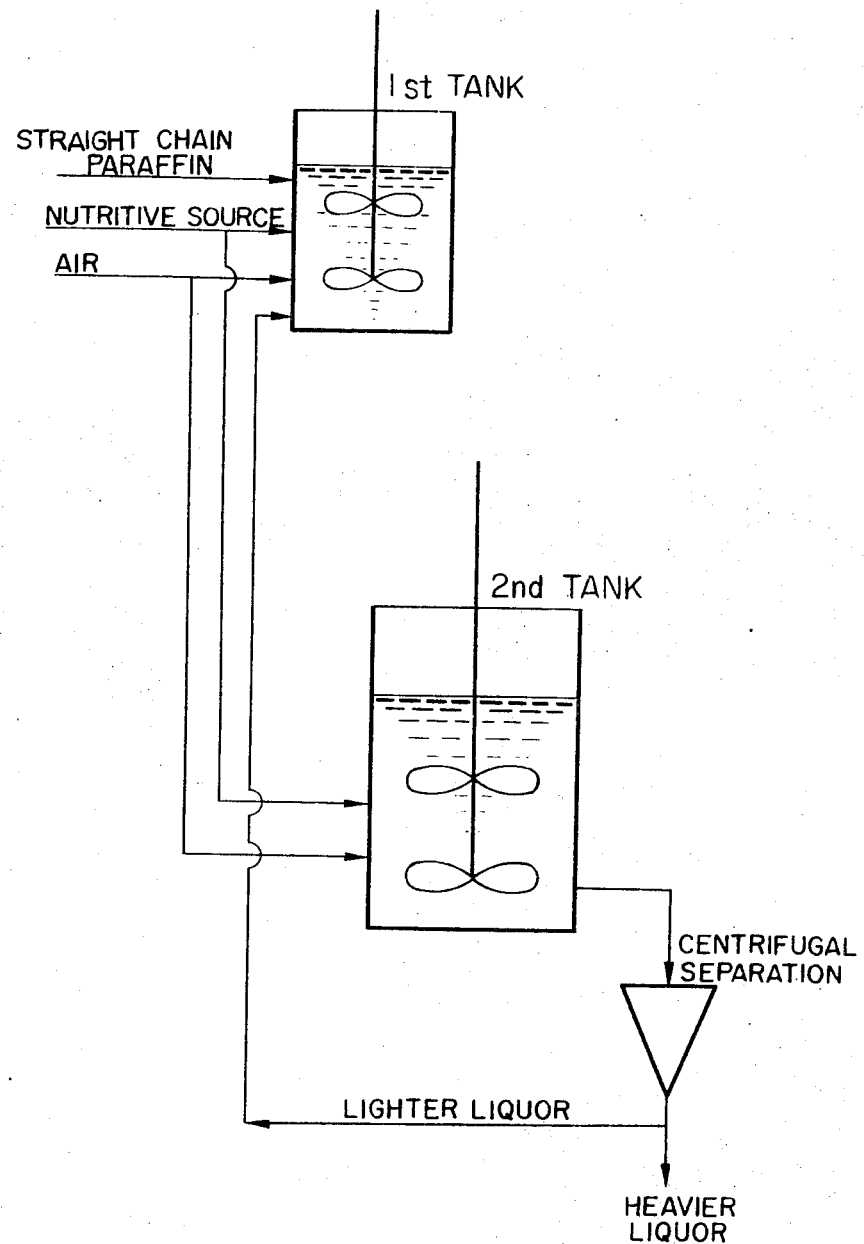

METHOD FOR THE CULTIVATION OF YEASTS IN A NUTRITIVE MEDIUM CONTAINING A NONIONIC SURFACE ACTIVE AGENT

BACKGROUND OF THE INVENTION

1. Field of the Invention

This invention relates to a method of cultivating hydrocarbon-consuming yeasts. More particularly, it is concerned with a process for efficiently producing yeast cells or fermentation products from hydrocarbons by carrying out a two-tank continuous cultivation of a species exerting excellent properties for the cultivation of yeast capable of consuming hydrocarbons as the carbon source, in which the emulsified hydrocarbon is subjected to fermentation in a main fermentation tank (the second tank), said hydrocarbon being obtained in the form of emulsion in an emulsification tank (the first tank) in which is fed the hydrocarbon at a high concentration and fermentation is conducted with the fermentation waste liquor and a nonionic surface active agent added. Further more particularly, the present invention is concerned with a method of cultivating yeasts comprising, in cultivating a species of the genus Torulopsis, Torulopsis petrophilum, a species of the genus Candida, Candida petrophilum, or a species of the genus Brettanomyces, Brettanomyces petrophilum in a medium consisting of a hydrocarbon fraction boiling at temperatures in the range from 200° to 360° C. and an aqueous solution containing inorganic salts, an inorganic nitrogen and organic nitrogen source usually employed for the cultivation of microorganisms, producing an emulsion of said medium with a portion of the fermentation waste liquor previously used and a small amount of a nonionic surface active agent added thereto in an emulsification tank, effecting fermentation in a main tank by the use of the emulsified hydrocarbon and isolating the mycelia and other fermentation products.

It is an object of this invention to provide a novel method of fermentation in which yeast cells are obtained in a high yield in terms of the hydrocarbon raw material. Another object is to provide a novel method of cultivating yeasts in a shorter period of cultivation time resulted from a shorter period of emulsifying time. A further object is provision of a novel method of hydrocarbon-consuming yeasts being advantageous from an industrial point of view. Other objects and advantages of this invention will be apparent from the descriptions as set forth hereinbelow.

2. Description of the Prior Art

It has been known heretofore that a number of microorganisms are able to consume hydrocarbons as the only source of carbon, which microorganisms include a wide variety of bacteria, actinomycetes, yeasts and fungi. However, there have been found a very limited range of species to consume the hydrocarbon at a high efficiency, with much difficulty encountered in satisfactorily utilizing the mycelia, namely, manufacture on an industrial level of useful natural products such as protein, nucleic acid and lipid from the petroleum source.

SUMMARY OF THE INVENTION

We have made extensive investigations of the source for the isolation of microorganisms from the soil with the result that a number of fresh yeasts useful for the object have been isolated which belong to the genera Torulopsis, Candida and Brettanomyces.

The present invention is based upon the discovery that the yeast cells can be formed with stability and efficiency by continuously feeding a medium consisting of hydrocarbon, inorganic nitrogen, inorganic salts and organic source of nitrogen to which the fermentation waste liquor previously used and a small amount of a nonionic surface active agent are added into an emulsification tank, mainly effecting formation of the hydrocarbon emulsion in the first tank, i.e., the emulsification tank and conducting the cells formation in the second tank, i.e., the main fermentation tank with the emulsified fermentation liquor passed thereto from the first tank. By the use of continuous fermentation carried out in such a manner, fermentation products other than the mycelia, such as amino acids, organic acids and vitamins, can be formed by the above-mentioned species with a high efficiency.

Fermentation conditions employed in the first and second tanks may be variable depending upon the species cultivated and the products desired. Cultivation temperature is, for example, from 25° to 37° C. and it is necessary to carry out the fermentation under aerobic conditions while controlling pH of the medium. Cultivation conditions such as temperature and pH may be those used in the prior processes and are not specifically limited. Separation of the cells from the fermentation liquor produced may be carried out in accordance with the procedures used in the prior processes and involves, for example, separation of the fermentation liquor into heavier and lighter liquors by means of a Westfalia separator, adjustment of pH of the former to approximately 5, addition of a nonionic surface active agent, e.g., polyoxyethylenesorbitan monolaurate in an amount as much as 0.005 ml. per 100 ml. of the former, heating the mixture to 50° C. followed by agitation, separation of the mycelia therefrom by means of a nozzle type Westfalia separator, washing the mycelia with water and drying the same in a drum dryer. Separation of the fermentation products may be conducted, for example, by subjecting the fermentation broth from which the mycelia have been removed to concentration treatment or treatment with an ion exchange resin for the fractional isolation.

The first characteristic feature of this invention, namely, continuous cultivation process, will be described below with reference to the accompanying drawing, which shows an example of an apparatus used in the process of the present invention. As shown in the Figure, in the two-tank continuous fermentation system, a medium consisting of the hydrocarbon at a high concentration, preferably from 5 to 40 percent by volume, inorganic salts, nitrogen source and organic nutritive source is placed in the first tank, in which a small amount of the nonionic surface active agent is added and then cultivation and emulsification of the hydrocarbon are effected and the emulsion from the first tank is fed, either continuously or intermittently into the second tank, in which, cultivation is conducted while feeding an aqueous medium consisting of inorganic salts, nitrogen source and organic nutritive source containing no hydrocarbon. It is necessary to carry out the cultivation under aerobic conditions in both of the first and second tanks. In the second tank is efficiently effected the main fermentation, that is, production of the cells or formation of the fermentation products.

There is no particular limitation regarding the nature of inorganic salts, nitrogen source and organic nutritive source used in the first and second tanks, which may be selected from those employed heretofore. For example, as the inorganic salt are mentioned dihydrogen potassium phosphate, monohydrogen potassium phosphate, magnesium sulfate, sodium chloride, ferrous sulfate, manganese sulfate, zinc sulfate, calcium chloride and the like. As the organic nutritive source may be employed peptone, N-Z amine, meat extract, yeast extract, corn steep liquor, casein hydrolyzate, fish meal, hydrolyzate thereof and the like. Nitrogen-containing materials such as ammonia, inorganic and organic ammonium salts, for example, ammonium chloride, sulfate, nitrate, carbonate, phosphate and acetate and urea may be utilized as the nitrogen source.

Secondly, this invention is characterized by addition in the medium in the first tank of the fermentation waste liquor previously used, preferably at a ratio from 5 to 75 percent by volume based on the entire medium, and further, of a small amount of a nonionic surface active agent such as polyoxyethylenesorbitan fatty acid esters, sorbitan fatty acid esters or polyethylene glycol derivatives. As the fermentation waste liquor may be used the lighter liquor from centrifugal separation as shown in the FIGURE, and sometimes, the fermentation waste liquor prior to the centrifugal separation or its hydrolyzate.

The third characteristic feature of the present invention lies in the use of three species as specified above which are of excellent hydrocarbon,consuming capacity and have excellent properties for the use of feed or food.

Combination of the above-described features produces much better results by the method of the present invention than by the prior methods, as understood from the descriptions below. First, continuous fermentation by the use of two-tank fermentation system enables feeding of hydrocarbon at a high concentration, thereby needing a smaller fermentation tank in which emulsion formation of the hydrocarbon requires a much shorter period of time as compared with the low-concentration feeding. As noted, the present invention has a feature in the provision of an emulsified tank in addition to a main fermentation tank unlike prior art processes. Second, efficiency of consuming hydrocarbon is very high in this invention. Generally in the prior art, it is known that the yeast is formed from hydrocarbons, particularly from straight-chain hydrocarbons at a ratio of 1 to 1 by weight. However, in the process according to this invention the former is obtained at a ratio higher than 1:1 from the latter, and the fermentation products are obtained at a higher efficiency than those in the prior processes. It should be especially noted that there has been no process where the yield of yeast mycelial formation exceeds 100 percent. The yield higher than 100 percent can be achieved first by the method according to this invention, and is accomplished by combination of the aforementioned three types of features. Other advantages of this invention will be obviously seen from the following descriptions, experiments and examples.

DESCRIPTION OF PREFERRED EMBODIMENTS

Effects of the addition of the fermentation waste liquor and alcohol in a small amount are described in more details by the experiments given below.

EXPERIMENT 1

Experiment was made using *Candida petrophilum* ATCC No. 20226.

Composition of the medium in the first tank is as follows:

| | |
|---|---|
| Straight chain paraffins containing from 14 to 17 carbon atoms (purity, 98% or higher) | 15% (by volume/volume) |
| Manganese sulfate | 0.004% (by weight/volume) |
| Magnesium sulfate | 0.05% (by weight/volume) |
| Calcium chloride | 0.01% (by weight/volume) |
| Urea | 0.3% (by weight/volume) |
| Ammonium sulfate | 0.2% (by weight/volume) |
| Ferrous sulfate | 0.005% (by weight/volume) |
| Corn steep liquor | 0.1% (by weight/volume) |

The medium of the above composition, pH 4.5, 4 l., is placed in the first tank, 8 l. in capacity, and maintained at the same concentrations of the nutrient sources. In fact, the consumed amounts of the inorganic salts, nitrogen source and organic nutritive source as determined by the yield of the product are constantly supplemented. In the use of fermentation waste liquor for emulsion formation, the shortage found in consideration of the composition of the waste liquor is supplied prior to the operation. Aerobic cultivation was carried out in the second tank, that is, 20 l. in volume of the medium was placed into 40 l. in volume of the tank, in which no hydrocarbon was added and an aqueous solution of the same composition as above except for the hydrocarbon was continuously fed. Table 1 shows the results of determination of the time of emulsion formation (residence time) in the first tank and the efficiency of mycelial formation in the second tank, in the case where the fermentation waste liquor is added at a ratio from 5 to 75 percent by volume on total medium. There are observed reduction in time required for emulsifying the hydrocarbon by the addition of the fermentation waste liquor in the first tank and rise in ratio of the formation.

TABLE 1

Effects of the fermentation waste liquor upon the emulsification and mycelial formation.

| Concentration of the fermentation waste liquor, % (by volume) | Time of emulsification (1st tank), hr. | Dried mycelia (g.) /hydrocarbon added (g.), % |
|---|---|---|
| 5 | 5 | 92 |
| 10 | 5 | 95 |
| 25 | 4 | 99 |
| 50 | 3.5 | 103 |
| 75 | 3 | 103 |
| 0 | 7 | 91 |

Fermentation conditions in the first tank: 30° C., 500 rpm., aeration 60 percent, liquor volume 4 l., adjusted to pH 4.5 – 5.0 by aqueous ammonia.
Fermentation condition in the second tank: 30° C., 400 rpm., aeration 100 percent, residence time 4 hours, liquor volume 20 l.

EXPERIMENT 2

The same strain, media, the concentration of hydrocarbon and fermentation conditions as in Experiment 1 were used and examined for the effect of combined use of the fermentation waste liquor and nonionic surface active agent. The results are shown in Table 2.

TABLE 2

Effects of the fermentation waste liquor and nonionic surface active agent upon the mycelial formation.

| Fermentation waste liquor (by volume) | Surface active agent (by weight/volume) | Dried mycelia (g.)/ added hydro- carbon (g.) |
|---|---|---|
| – | – | 90% |
| 5% | Polyoxyethylene lauryl alcohol ether  0.002% | 97% |
| 10% | " | 107% |
| 25% | " | 114% |
| 50% | " | 118% |
| 75% | " | 118% |
| – | Polyoxyethylene lauryl alcohol ether  0.002% | 92% |
| 25% | Polyoxyethylene sorbitan dioleate  0.002% | 115% |
| – | " | 91% |
| 25% | Sorbitan monolaurate  0.002% | 115% |
| – | " | 90% |

Experiments were made with a residence time both in the first and second tanks of 4 hours.

As clearly seen from Table 2, simultaneous addition of the fermentation waste liquor and nonionic surface active agent produced remarkable synergistic effects. Similar effects are produced also for fermentation products other than the mycelia. No reports have been published regarding the improvement in the yield of mycelia resulted from combination of the fermentation waste liquor and surface active agent and this invention may be highly significant from an industrial point of view.

As described above, combination of the use of a strain capable of efficiently consuming hydrocarbons, the use of two fermentation tanks, an emulsification tank and main fermentation tank and addition in the emulsification tank of the fermentation waste liquor previously used and a small amount of a nonionic surface active agent is most suitable for formation of the yeast or the fermentation products with stability, at a high efficiency in terms of the hydrocarbon and in a short period of time and isolation thereof. The two-tank fermentation of this invention is entirely different in principle from the prior two-tank fermentation comprising an aging tank arranged in row.

The following specific examples further illustrate the invention.

EXAMPLE 1

Continuous fermentation of a yeast was carried out in two fermentation tanks containing media of the following compositions. The yeast used was *Candida petrophilum* ATCC No. 20226.

| Medium in the first tank: | |
|---|---|
| Straight chain paraffins containing from 14 to 17 carbon atoms (purity 98% or higher) | 20 ml. |
| Ammonium sulfate | 0.3 g. |
| Urea | 0.3 g. |
| Monobasic potassium phosphate | 0.1 g. |
| Dibasic potassium phosphate | 0.1 g. |
| Sorbitan monolaurate | 0.002 g. |
| Magnesium sulfate | 0.01 g. |
| Ferrous sulfate | 0.005 g. |
| Corn steep liquor | 0.2 g. |
| Tap water | 100 ml. |
| pH 5.5 | |
| Medium in the second tank: | |
| Ammonium sulfate | 0.3 g. |
| Monobasic potassium phosphate | 0.1 g. |
| Dibasic potassium phosphate | 0.1 g. |
| Magnesium sulfate | 0.01 g. |
| Ferrous sulfate | 0.005 g. |
| Vitamin $B_1$ | 100 $\gamma$ |
| Tap water | 100 ml. |
| pH 4.5 | |

The medium in the first tank contains 20 percent by volume of the hydrocarbon and the medium in the second tank contains no hydrocarbon. The fermentation liquor was transferred from the first tank to the second tank for effecting the continuous cultivation with the residence times under the conditions set forth below. In the first and second tanks respectively in capacities of 8 l. and 40 l. were placed 4 l. and 20 l. of the medium respectively. The mycelia in the second tank after completion of the fermentation were removed by centrifugal separation and the lighter liquor was passed to the first tank to prepare a mixture of the lighter liquor and the fresh medium at a ratio of 4:6 by volume for the fermentation therein. The residence time in the first tank was 3 hours and the fermentation in the second tank was completed in 4 hours. The fermentation conditions in the first tank were 30° C., pH 5.0 – 6.0 adjusted with aqueous ammonia, 400 rpm. and 100 percent of aeration. The second tank was controlled under such conditions as 33° C., pH 4.5 – 5.0, 400 rpm. and 100 percent of aeration. The fermentation liquor thus produced was subjected to centrifugal separation by means of a Westfalia separator into lighter and heavier liquors. To the heavier liquor was added a sorbitan aliphatic acid ester at a ratio of 0.005 g. per 100 ml. of the fermentation liquor and the mixture was heated to 50° C. followed by centrifugal separation. The mycelia thus separated were washed with water and dried over a drum drier. The yield was 108 g. of the yeast mycelia on a dried basis per 100 g. of the hydrocarbon added. Efficiency of the isolation of the mycelia by the use of a Westfalia separator was 92 percent, which enabled use as they were in the animal feed as a protein source.

EXAMPLE 2

*Torulopsis petrophilum* ATCC No. 20225 was cultivated by the process entirely identical with that in Example 1. A surface active agent polyethylene glycol lauryl alcohol ether was continuously added to the first tank at a concentration of 0.002 percent. Continuous fermentation was conducted using as the second tank a Waldhof type tank of the same capacity as in Example 1. Employing the conditions of fermentation and treatment after separation of the cells entirely identical with those in Example 1 resulted in the dried cells in a yield of 106 g. per 100 g. of the hydrocarbon added.

EXAMPLE 3

Continuous fermentation of yeast was conducted in two fermentation tanks containing media of the following compositions, using *Candida petrophilum* ATCC No. 20226.

| Medium in the first tank: | |
|---|---|
| Normal hexadecane | 20 ml. |
| Ammonium sulfate | 0.3 g. |
| Urea | 0.3 g. |
| Monobasic potassium phosphate | 0.1 g. |
| Dibasic potassium phosphate | 0.1 g. |
| Polyoxyethylene sorbitan dioleate | 0.002 g. |
| Magnesium phosphate | 0.01 g. |
| Ferrous phosphate | 0.005 g. |
| Corn steep liquor | 0.2 g. |
| Tap water | 100 ml. |
| pH 5.5 | |
| Medium in the second tank: | |
| Ammonium sulfate | 0.3 g. |
| Monobasic potassium sulfate | 0.1 g. |
| Dibasic potassium phosphate | 0.1 g. |
| Magnesium sulfate | 0.01 g. |
| Ferrous sulfate | 0.005 g. |
| Waste molasses | 0.3 g. |
| Trimethyloctadecyl ammonium chloride | 0.05 g. |
| Tap water | 100 ml. |
| pH 5.5 | |

A similar medium to that used in Example 1 was innoculated with the yeast and placed in the same vessel. The mycelia after completion of the fermentation in the second tank were removed by centrifugal separation and the lighter liquor was passed to the first tank, in which fermentation was carried out in a mixture of the lighter liquor and the fresh medium at a ratio of 4:6 by volume. The residence time in the first tank was 3 hours and the fermentation in the second tank was completed in 5 hours. Continuous fermentation was effected under such conditions in the first tank as 30° C., pH 5.0 – 6.0, 500 rpm. and 100 percent of aeration and under such conditions in the second tank as 30° C., pH 5.0 – 6.0 adjusted with an alkali, 400 rpm. and 100 percent of aeration. From the fermentation liquor thus obtained were removed cells by centrifugal separation and the fermentation broth was made acidic with sulfuric acid. Ether was then added to the acidified fermentation broth at a ratio of 300 ml. of the former per 1 l. of the latter. The extraction was repeated twice and the ether was removed from the extract under reduced pressure. The residue was allowed to stand in a cold place to obtain 14 g. of crystalline citric acid from 1 l. of the fermentation broth.

EXAMPLE 4

Cultivation of *Brettanomyces petrophilum* ATCC No. 20224 was carried out under the same conditions as in Example 1 except that straight chain paraffins containing from 11 to 15 carbon atoms (purity 98 percent or higher) were used. The yeast media were obtained in a yield of 101 g. on a dried basis per 100 g. of the added hydrocarbon.

We claim:

1. Method of cultivating yeasts by a continuous fermentation process which comprises (a) cultivating *Torulopsis petrophilum*, *Candida petrophilum* or *Brettanomyces petrophilum*, a species of yeast capable of consuming hydrocarbons as the carbon source in a medium containing a hydrocarbon fraction boiling at temperatures in a range from 200° to 360° C.; (b) conducting said cultivation in an apparatus consisting of (1) an emulsification tank to form an emulsion of said hydrocarbon and an aqueous solution and (2) a main fermentation tank for effecting mycelial formation or fermentative production of useful substances, said tank being connected in series; (c) using as the medium in said emulsification tank a medium containing said hydrocarbon at a concentration of from about 5 to about 40 percent by volume, from about 5 to about 75 percent by volume of the fermentation waste liquor from the main fermentation tank and from about 0.001 to about 0.05 percent by weight of a nonionic surface active agent; and (d) using as the medium in said main fermentation tank the emulsified fermentation liquor obtained in said emulsification tank.

2. Method according to claim 1 wherein said hydrocarbon is a straight chain hydrocarbon.

3. Method according to claim 1, wherein the cultivation temperature of (a) is from 25° to 37° C.

4. Method according to claim 1, wherein the cultivation temperature of (b) is from 25° to 37° C.

5. Method according to claim 1, wherein the surface active agent is a polyoxyethylene lauryl alcohol ether.

6. Method according to claim 1, wherein the surface active agent is a polyoxyethylene sorbitan dioleate.

7. Method according to claim 1, wherein the surface active agent is sorbitan monolaurate.

* * * * *